United States Patent
Soby et al.

(10) Patent No.: US 12,381,882 B1
(45) Date of Patent: Aug. 5, 2025

(54) BRIDGING BETWEEN SOURCE APPLICATIONS AND AUTHORIZATION SYSTEMS

(71) Applicant: AppOmni, Inc., San Francisco, CA (US)

(72) Inventors: Brian Soby, Carbondale, CO (US); Timothy Bach, Washington, DC (US); Brandon Levene, Washington, DC (US)

(73) Assignee: AppOmni, Inc., San Francisco, CA (US)

( * ) Notice: Subject to any disclaimer, the term of this patent is extended or adjusted under 35 U.S.C. 154(b) by 0 days.

(21) Appl. No.: 18/827,408

(22) Filed: Sep. 6, 2024

Related U.S. Application Data

(60) Provisional application No. 63/570,434, filed on Mar. 27, 2024.

(51) Int. Cl.
*H04L 9/40* (2022.01)

(52) U.S. Cl.
CPC ............ *H04L 63/102* (2013.01); *H04L 63/20* (2013.01)

(58) Field of Classification Search
CPC .............................. H04L 63/102; H04L 63/20
USPC .............................................................. 726/4
See application file for complete search history.

(56) References Cited

U.S. PATENT DOCUMENTS

| | | | |
|---|---|---|---|
| 2015/0213449 A1* | 7/2015 | Morrison | G06Q 20/4016 705/44 |
| 2023/0370347 A1* | 11/2023 | Digikar | G06F 11/3495 |

* cited by examiner

*Primary Examiner* — Anthony D Brown
(74) *Attorney, Agent, or Firm* — Van Pelt, Yi & James LLP

(57) ABSTRACT

Bridging between source applications and authorization systems is disclosed, including: monitoring an update across a set of source application servers; translating the update into a synthetic message using source application information associated with the set of source application servers and an attribute associated with a target authorization system; and sending the synthetic message to the target authorization system, wherein the target authorization system is configured to instruct an authorization action to be performed at one or more of the set of source application servers.

18 Claims, 6 Drawing Sheets

BRIDGING BETWEEN SOURCE APPLICATIONS AND AUTHORIZATION SYSTEMS

CROSS REFERENCE TO OTHER APPLICATIONS

This application claims priority to U.S. Provisional Patent Application No. 63/570,434 entitled BRIDGING BETWEEN APPLICATIONS AND AUTHORIZATION SYSTEMS filed Mar. 27, 2024 which is incorporated herein by reference for all purposes.

BACKGROUND OF THE INVENTION

Many security approaches, such as Zero Trust or Shared Signals, call for the creation of a feedback or monitoring mechanism to the architecture where certain state changes or user activities can trigger a message or event to other systems to allow for insights or actions by those systems, such as an updated authorization decision. For example, an "authorization decision" may involve an authorization system prompting an entity (e.g., a user) for re-verification after the initial login. However, in order to be most effective, such a feedback mechanism requires the active support and participation of as many components and sensors in the architecture as possible.

Historically, most Zero Trust components have been network-centric, but the rise of software as a service (SaaS) and other cloud-based applications has created a significant gap in Zero Trust architectures. Based on current Zero Trust reference architectures, there is no visibility into changes or user activities within SaaS/cloud applications themselves. Many proposals have been made which would involve SaaS/cloud applications building direct support into their capabilities for Zero Trust event subscribers and emitting messages as appropriate to these subscribers. However, the requirements for substantial changes to these applications make these proposals unlikely to gain traction with a meaningful percentage of application developers. Given that modern enterprises commonly use hundreds of SaaS and other cloud applications, there is not likely to be sufficient adoption of these proposals by SaaS and other cloud application developers to gain critical mass in solving the problem. Additionally, the scope of change or activity message types supported by these proposals is often too narrow and changes frequently, further complicating a system requiring up-to-date support directly by the SaaS and other cloud applications. It would be desirable to enable changes/activities detected at SaaS and other cloud applications to be efficiently consumed by authorization systems.

BRIEF DESCRIPTION OF THE DRAWINGS

Various embodiments of the invention are disclosed in the following detailed description and the accompanying drawings.

DETAILED DESCRIPTION

Figure 1:
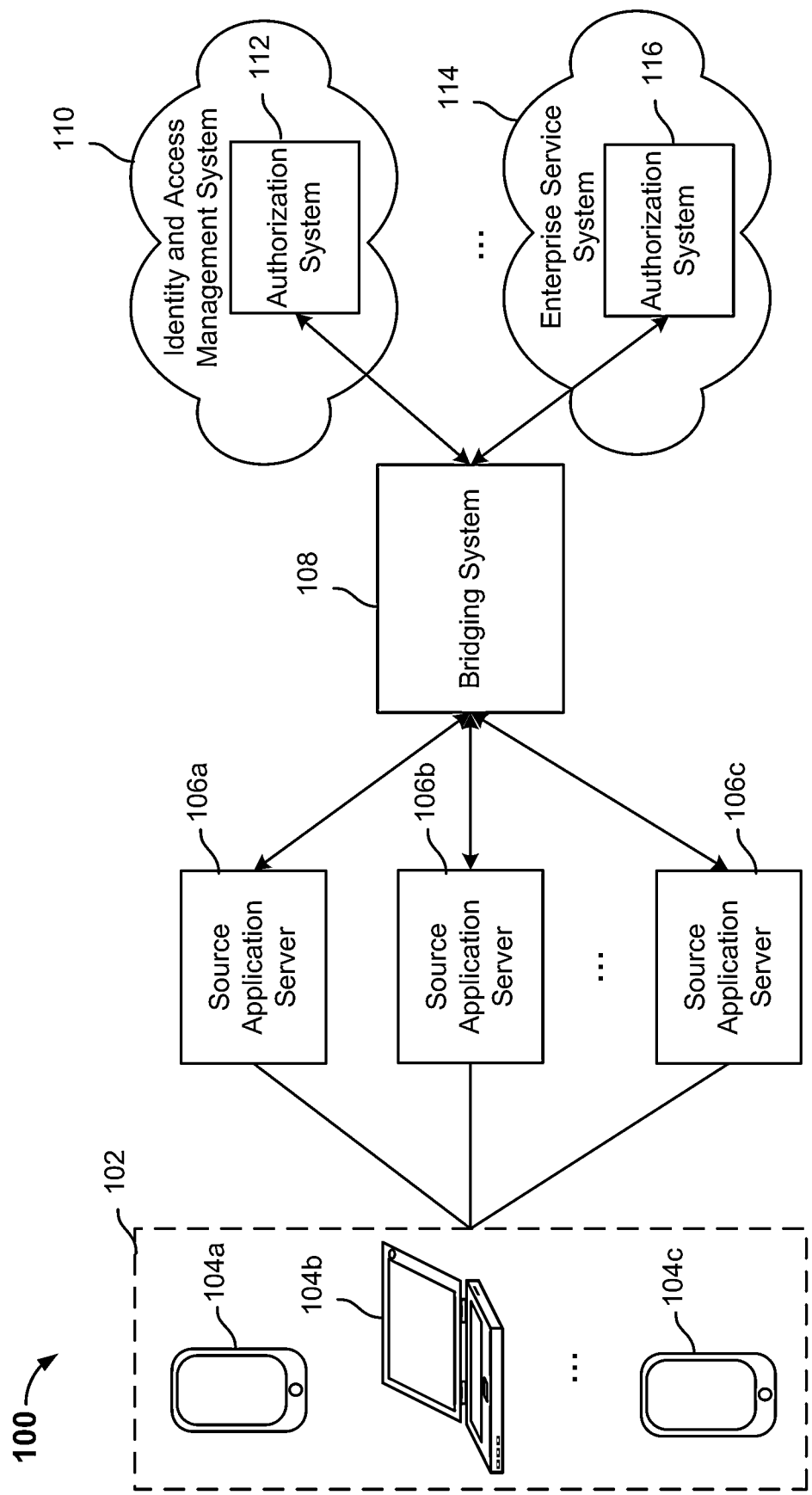
FIG. 1 is a diagram showing an embodiment of a system for bridging between source applications and authorization systems.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of bridging between source applications and authorization systems are described herein. An update across a set of source application servers is monitored. In various embodiments, a "source application server" comprises a server implementing a software as a service (SaaS) or other cloud-based application. For example, each source application server may be providing enterprise-level services to one or more organizations. In various embodiments, an "update" may comprise one or more activities, state changes, or other events that have occurred at one or more source application servers. The update is translated into a synthetic message using organization information and an attribute associated with a target authorization system. For example, "source application information" comprises an aggregation of entity (e.g., a user, an integration, or an automated process) information (e.g., global IDs, source application-specific properties (e.g., the format of event logs), and statistics) across the one or more source application servers. In various embodiments, the synthetic message is generated to be in a format that conforms to a protocol that is recognized by the target authorization system. The synthetic message is sent to the target authorization system. The target authorization system is configured to instruct an authorization action to be performed at one or more of the set of source application servers in response to the synthetic message.

FIG. 1 is a diagram showing an embodiment of a system for bridging between source applications and authorization systems. As shown in system 100, source application servers such as source application server 106a, source application server 106b, and source application server 106c are each configured to provide a cloud-based software service (e.g., a software as a service (SaaS)) to the users (e.g., comprising devices such as mobile device 104a, laptop device 104b, and mobile device 104c) of organization 102. For example, organization 102 is an enterprise organization and one or more of source application server 106a, source application server 106b, and source application server 106c are configured to provide an enterprise-level SaaS product (e.g., an application, cloud, custom device, or other application) to users of organization 102.

To provide a layer of security between organization 102's data that is managed by source application servers (e.g., source application server 106a, source application server 106b, and source application server 106c), external authorization systems are employed to trigger authorization actions with respect to users of and/or access to the SaaS products based on events that occur at the source application servers. For example, such authorization systems (e.g., authorization system 112 and authorization system 116) are components of a suite of (e.g., enterprise-level) services such as identity and access management system 110 that provide services such as single sign-on for enterprise users and enterprise service system 114 that provides another type of suite of enterprise-level services. Regardless of which overall service an authorization system is a component thereof, each instance of an authorization system is configured to trigger authorization actions (e.g., prompt an entity to reauthenticate, restrict or deny an entity access to a SaaS product, programmatically log an entity out, etc.) with respect to users of and/or access to the SaaS products using feedback collected from the source application servers. To be effective, such a feedback mechanism requires the active support and participation of as many components and sensors in the architecture as possible. However, typically, many source application servers themselves do not support generating and/or sending events pertaining to state changes or user activities in accordance with (e.g., tracing) protocols (e.g., Shared Signals, OpenTelemetry) proposed for providing such feedback to the authorization systems. As a result, the authorization systems (e.g., authorization systems 112 and 116) typically lack the visibility into changes or user activities within SaaS/cloud applications that is required as the basis for authorization decisions.

In various embodiments, bridging system 108 is configured to monitor updates at one or more source application servers (e.g., source application servers 106a, 106b, and 106c) (in relation to entities such as users (e.g., 104a, 104b, or 104c) or other entities) and package such updates into synthetic messages that are then forwarded to an appropriate authorization system (e.g., one or more of authorization systems 112 and 116). As will be described in further detail below, bridging system 108 is configured to (e.g., continuously) analyze source application servers that may have little or no native capabilities for participation within an external authorization system. For example, bridging system 108 comprises a SaaS security posture management (SSPM) product with (e.g., continuous) visibility into the state of application configurations and user activities. Bridging system 108 is configured to enable any SaaS product (e.g., an application, cloud, custom, device, or other application) to be incorporated into (e.g., external) observing, receiving, or authorization systems by the monitoring, creation, and/or translation of messages from the SaaS products and the sending of processed synthetic messages to the observing systems. In some embodiments, when bridging system 108 observes monitored applications' relevant configuration, data, or other state changes that could qualify for a message to the observing or authorization system, bridging system 108 creates a synthetic message on behalf of that SaaS product (or itself) that represents the observed change(s). Bridging system 108 then sends that message to the authorization system (or other observing service) for evaluation. For example, such synthetic messages may optionally include, but are not limited to, information to identify the series of actual changes, observations, or source systems that were considered as part of their creation.

In various embodiments, bridging system 108 is configured to obtain and effectuate an authorization action from an authorization system. In a first example, bridging system 108 can cause the authorization action to be accommodated at a SaaS product by, for example, translating the instruction into one or more configurations or actions that are compatible with/supported by the SaaS product. In a second example, bridging system 108 can cause the authorization action to be accommodated at a SaaS product by triggering a service other than the SaaS product to reverify a user.

While not shown in FIG. 1, each component of system 100 (e.g., devices 104a, 104b, and 104c; source application servers 106a, 106b, and 106c; bridging system 108; identity and access management system 110 including authorization system 112; and enterprise service system 114 including authorization system 116) is configured to communicate with each other over one or more networks.

As described in system 100, bridging system 108 provides authorization systems visibility into relevant updates at the source application servers in the form of synthetic messages using (e.g., tracing) protocols (e.g., Shared Signals, OpenTelemetry) that have been adopted by the authorization systems, regardless of whether the SaaS products that are implemented by the source application servers have adopted such protocols. Furthermore, bridging system 108 can receive authorization actions that are determined by the authorization systems after ingesting such synthetic messages and then effectuate the authorization actions at the affected source application servers in ways that are either compatible with the supported features of the SaaS products or otherwise achieve a desired end result. In this way, bridging system 108 can bring the events of various SaaS products under the observation of one or more authorization systems without requiring developers of the SaaS products to adopt any new or uniform protocols for signal sharing.

Figure 2:
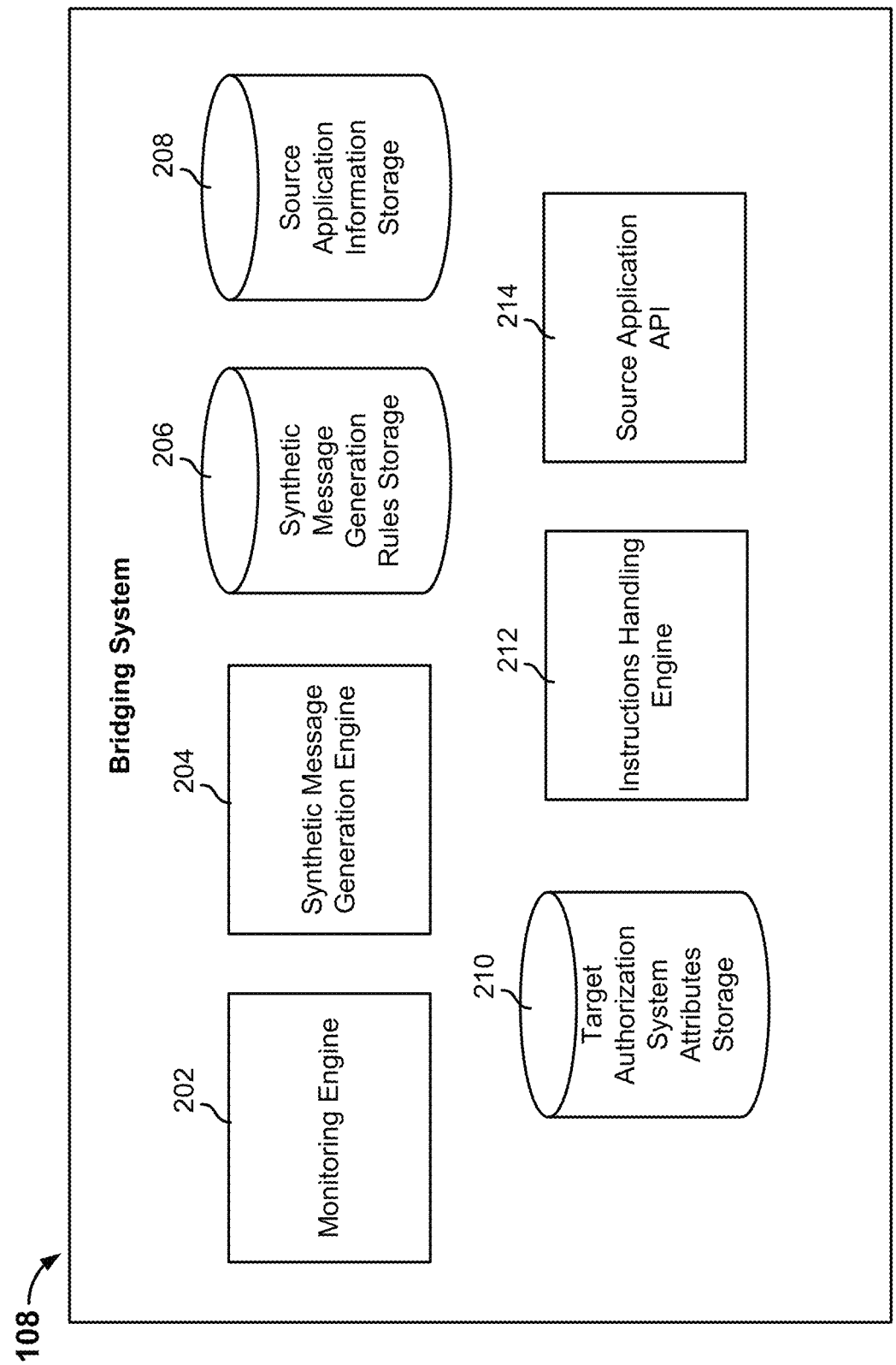
FIG. 2 is a diagram showing an example of a bridging system in accordance with some embodiments.

FIG. 2 is a diagram showing an example of a bridging system in accordance with some embodiments. In some embodiments, bridging system 108 of system 100 of FIG. 1 may be implemented using the example bridging system of FIG. 2. In the example of FIG. 2, the bridging system includes monitoring engine 202, synthetic message generation engine 204, synthetic message generation rules storage 206, source application information storage 208, target authorization system attributes storage 210, instructions handling engine 212, and source application application programming interface (API) 214. Each of monitoring engine 202, synthetic message generation engine 204, synthetic message generation rules storage 206, source application information storage 208, target authorization system attributes storage 210, instructions handling engine 212, and source application API 214 may be implemented using software and/or hardware (e.g., one or more processors and/or one or more memories).

Monitoring engine 202 is configured to detect changes at one or more source application servers. In some embodiments, monitoring engine 202 is already connected to one or more SaaS product(s)/application(s) that are implemented by source application servers based on a relationship between the party operating the bridging system and an organization or enterprise that subscribes to the SaaS product(s)/application(s). For example, an administrative user at an enterprise can submit the credentials to the enterprise's accounts at the SaaS products to monitoring engine 202 via a user interface provided by monitoring engine 202 (e.g., a website that is accessible by a web browser executing at) using a client device. Based on the received credentials, monitoring engine 202 is configured to connect to the enterprise's data stored, processed, or otherwise made available at the source application servers of the SaaS products to which the enterprise subscribes to corresponding services. As such, monitoring engine 202 is configured to monitor changes, events, and/or activities with respect to one or more entities, or not related to any particular entity, that occur at a source application server. In various embodiments, an "entity" may refer to a user, an integration, and/or an automated process. Examples of the changes that can be observed at one or more source application servers by monitoring engine 202 may include one or more of the following:

Entity gains access to a permission, entitlement, data type, data record, or other change to access.
Entity performed a relevant action or behavior in an application such as accessing data, reports, or application components.
Entity connected to another system, integration, or application on their behalf.
Entity was observed changing Internet Protocol (IP) address or location.
Entity elevated permissions for itself or another entity.
Entity utilized administrative or elevated permissions.
Entity performed a create, read, update, delete, query, search, or other operation on data.
Entity was created, deleted, enabled, disabled, updated, or changed.
Data record, type, classification, label, or metadata was created, identified, discovered, added, updated, or found.
Data was created, updated, or deleted.
An application component such as a folder, portal, data store, code, page, plugin, extension, or other mechanism, for example, was created, updated, deleted, upgraded, or affected with another operation.

In some embodiments, monitoring engine 202 is configured to monitor the logs or events of one or more source application servers to create monitoring events sent to observers and/or authorization systems based on an entity's actual or observed behaviors within a system. Those events may optionally take into consideration additional information derived from external log streams (e.g., firewalls, proxies, downstream integrations, etc.), additional information derived from the configuration of the application (e.g., data classifications, data types, permissions used, etc.), or information from external systems (e.g., vulnerability database, scanner, data classification repository, artificial intelligence, or alerting system). The events may also take into consideration historic behaviors in that system, the target entities or entities similar to the target entities, time of day, location, or other factors related to the events.

In some embodiments, instead of or in addition to monitoring engine 202 connecting to one or more source application servers to observe changes/events/logs at the SaaS products, monitoring engine 202 is configured to receive messages from the one or more source application servers and where each message indicates a documented change, user activity, or event that occurred at the relevant SaaS product. For such received messages from the source application server(s), monitoring engine 202 is configured to augment the native capabilities of a SaaS or other application in order to expand or augment functionality supported by an application. Examples of the augmentation that may be performed by monitoring engine 202 are messages received from the one or more source application servers that may include one or more of the following:

Mapping a user-centric message to a global user identity or identifier, which may or may not be augmented into the message.
Adding new types of messages for events, changes, or other activities that an application may not natively send, or adding to, deleting from, or changing of data or fields within a message.
Additional message subscription, routing, distribution hub, distribution point consolidation, delivery, or transportation options for messages.
Providing filtering capabilities for synthetic or application-emitted messages based on risk scores, asset criticality, or identity context. For example, some application-emitted messages may not be passed on to a target authorization system if the associated risk score does not meet a threshold score.
Security of messages by authentication, encryption, hashing, or digital signing.
Efficient transmission of messages through compression, bulk packaging, message grouping capabilities, or pruning.
Translation or mapping messages to other systems though format changing, protocol conversion, language translation, or message translation.

In some embodiments, monitoring engine 202 can act as a relay for applications that are not otherwise available to an authorization system. For example, monitoring engine 202 may collect, poll, analyze, or receive from a SaaS source application that is not otherwise available to an authorization service or other observer. This may be for reasons of permissions, network connectivity, classification level, authentication, or compliance level. One specific example of such a source application is a highly sensitive government application that is not permitted to directly connect to an authorization system and so monitoring engine 202 of the bridging system can receive pushed telemetric updates from the sensitive source application and then forward these updates in the form of synthetic messages to the authorization system.

Synthetic message generation engine 204 is configured to generate synthetic messages based on the changes observed by and/or application-emitted messages received by monitoring engine 202, and then send the synthetic messages to one or more target authorization systems. In various embodiments, a "synthetic message" comprises a message that is not natively generated by a source application server but a message (describing a change, event, or activity that has occurred at one or more SaaS products) that is packaged by the bridging system to conform to a format/protocol that is recognized by an authorization system. In various embodiments, synthetic message generation engine 204 is configured to generate synthetic messages in accordance with the rules prescribed by synthetic message generation rules storage 206, source application information storage 208, and target authorization system attributes storage 210. For example, rules stored in synthetic message generation rules storage 206 prescribe when multiple observed changes and/or received application-emitted messages received over time and/or across multiple source application servers should be combined into a single synthetic message or when individual changes should be sent as individual synthetic messages. For example, source application information storage 208 describes each information aggregated on an organization's (e.g., enterprise's) users, configurations, roles, and/or policies across one or more SaaS products that are implemented across the source application servers. Specifically, source application information storage 208 may store mappings between a user's global user identifier (ID) and the same user's application-specific ID at each of one or more SaaS products. For example, source application information storage 208 also stores information regarding which functions/capabilities are natively supported by each source application. For example, target authorization system attributes storage 210 stores for each target authorization system, the protocol that the authorization system uses/recognizes/has adopted, the message format that the authorization system uses/recognizes/has adopted, and/or which SaaS source application/product's message format that the authorization system uses/recognizes/has adopted.

In some embodiments, synthetic message generation engine 204 can modify the content of observed changes or application-emitted messages, for example, by using supplemental information (e.g., by adding additional fields that were not included in the received messages and/or replacing values in the received messages with different values). In some embodiments, synthetic message generation engine 204 can add into a synthetic message to a target authorization system a threat detection conclusion that is derived by processing one or more changes observed at a SaaS source application. In some embodiments, synthetic message generation engine 204 can package a synthetic message into a format/protocol (e.g., Shared Signals or OpenTelemetry) that is used/recognized/adopted by a corresponding target authorization system that is associated with the relevant organization or the SaaS source application(s) from which the change(s) were observed.

In some embodiments, synthetic message generation engine 204 can combine multiple observed changes across one or more SaaS source applications into synthetic message (s), including the following examples:

Creating "virtual" applications or systems that represent multiple real SaaS source applications or real SaaS source applications augmented with additional information. For example, a SaaS source application's data and configuration could be augmented with external data classification information in order to create higher fidelity messages containing classifications of data or messages only feasible with both the information present in the SaaS source application and the external data source.

Cross-application messages that add additional fidelity, reduce noise, or are only possible with a cross-SaaS source application view. For example, the behaviors of a user can be observed across multiple SaaS source applications and a synthetic message can be generated using the combined information, such as failed logins across many services.

In some embodiments, synthetic message generation engine 204 can masquerade the changes observed at a first SaaS source application to appear as if they had originated at a different SaaS source application or an application of a different type including, for example:

Translate messages from a SaaS source application to appear as if they are from another application or type of application. This may be used to allow an authorization service or other observer to support an application not otherwise supported.

Replay historic messages, possibly with alterations or changes, to support recovery, investigations, incidents, onboarding of new authorization or other observers, etc.

Instructions handling engine 212 is configured to receive instructions comprising authorization actions from target authorization systems and effectuate the actions in ways that are compatible with the SaaS source applications implemented by the one or more source application servers. In some embodiments, the authorization actions comprise actions to be taken with respect to an entity in response to one or more synthetic messages that were sent by synthetic message generation engine 204. In some embodiments, instructions handling engine 212 is configured to accept actions, responses, updates, or other instructions from target authorization systems or other observers that should be performed and translate them into the correct action, message, or update (or series of actions, messages, or updates) to perform in the target SaaS source application. In a specific example, in response to a synthetic message, a target authorization service may instruct for a SaaS source application to disable an entity, in the manner that would be appropriate for that application type. However, the bridging system may have been presenting that bridged application to the authorization system as a different type of application (e.g., based on the content and/or format of the synthetic message that synthetic message generation engine 204 sends to the authorization system on behalf of the application) than it is in actuality. Instructions handling engine 212 could then translate, and optionally perform, the authorization action or actions in the manner that would be appropriate for the real nature of the bridge application.

In some embodiments, instructions handling engine 212 is configured to determine whether an authorization action from a target authorization system can be directly performed at the target SaaS source application itself (e.g., the target SaaS source application natively supports the action that is instructed by the target authorization system), in which case the instruction is a passed through to the application. In some embodiments, when a target source application that is identified by the instruction natively supports the prescribed authorization action(s), instructions handling engine 212 can also leverage source application API 214 to issue one or more appropriate API calls to the target source application to result in the desired result at the target source application.

In some embodiments, instructions handling engine 212 is configured to determine if an authorization action from a target authorization system can not be directly performed at the target SaaS source application itself (e.g., the target SaaS source application does not natively support the action that is instructed by the target authorization system) (e.g., based on the information stored at source application information storage 208), in which case instructions handling engine 212 is configured to provide an implementation for that instruction to be performed at the target SaaS source application. For example, instructions handling engine 212 may allow for the support of additional instructions or remediation as requested by a target authorization system or other observer. For example, a monitoring synthetic message sent to a target authorization system may result in an instruction from the target authorization system to disable or log out an entity. While the target SaaS source application, target authorization system, or other participating entity may not natively support the execution of that instruction, instructions handling engine 212 may provide an implementation for that instruction to be performed in the target source application.

In some embodiments, instructions handling engine 212 is configured to determine if an authorization action from a target authorization system may not be directly performed at the target SaaS source application itself (e.g., the target SaaS source application does not natively support the action that is instructed by the target authorization system or is not able to handle such an action) (e.g., based on the information stored at source application information storage 208), and in some embodiments, the bridging service may provide for alternate implementations that approximate (e.g., closely replicate) the effect of an instruction from the target authorization system. For example, in response to an instruction to disable an entity within an application, the instructions handling engine 212 may instead remove all permissions and entitlements of the entity, block access to application APIs or interfaces, restrict the eligible source IP address from which the entity may access an application, or other compensating or mitigating action.

Figure 3:
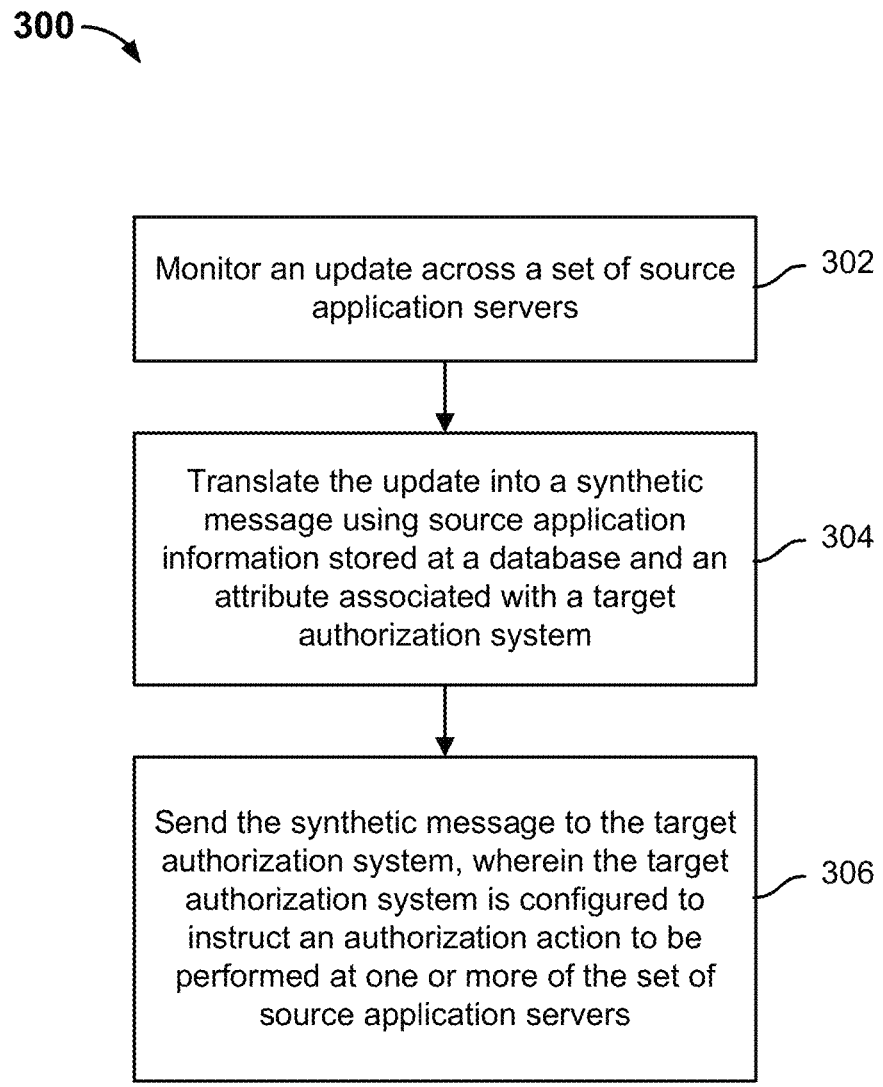
FIG. 3 is a flow diagram showing an embodiment of a process for bridging source applications and authorization systems.

FIG. 3 is a flow diagram showing an embodiment of a process for bridging source applications and authorization systems. In some embodiments, process 300 is implemented at a bridging system such as bridging system 108 of system 100 of FIG. 1.

At 302, an update across a set of source application servers is monitored. In various embodiments, the update comprises one or more of state changes, activities, events, or messages observed from one or more source application servers implementing SaaS applications. The update may pertain to zero or more entities comprising users, integrations, or automated processes.

At 304, the update is translated into a synthetic message using source application information stored at a database and an attribute associated with a target authorization system. In some embodiments, the update may be translated into one or more synthetic messages associated with monitoring. In a first example, translating the update may include modifying the content of the observations including by adding supplemental fields (e.g., adding additional information that is relevant to the observed changes/activities) from aggregated information related to an organization (e.g., an enterprise) and/or replacing a value (e.g., a source application-specific user ID) in the observations with another value (e.g. a global user ID corresponding to the same user) based on the normalized values maintained for the enterprise. In a second example, translating the update may include combining multiple (e.g., related) observations across multiple source applications into one synthetic message. In a third example, translating the update may include augmenting a message from a first source application to resemble the format of a second, different source application. In a fourth example, translating the update may include formatting the synthetic message in a manner based on an attribute of the target authorization system, where the attribute comprises the (e.g., tracing) protocol that is adopted by the target authorization system.

At 306, the synthetic message is sent to the target authorization system, wherein the target authorization system is configured to instruct an authorization action to be performed at one or more of the set of source application servers. In some embodiments, after the synthetic message is sent to the target authorization system, the target authorization system evaluates the synthetic message to determine whether an authorization system should be performed at one or more of the source applications. An instruction comprising an authorization action may be sent from the target authorization system and then the authorization action may be effectuated by the bridging system to take place using native function(s) of the affected target application or otherwise approximated.

Figure 4:
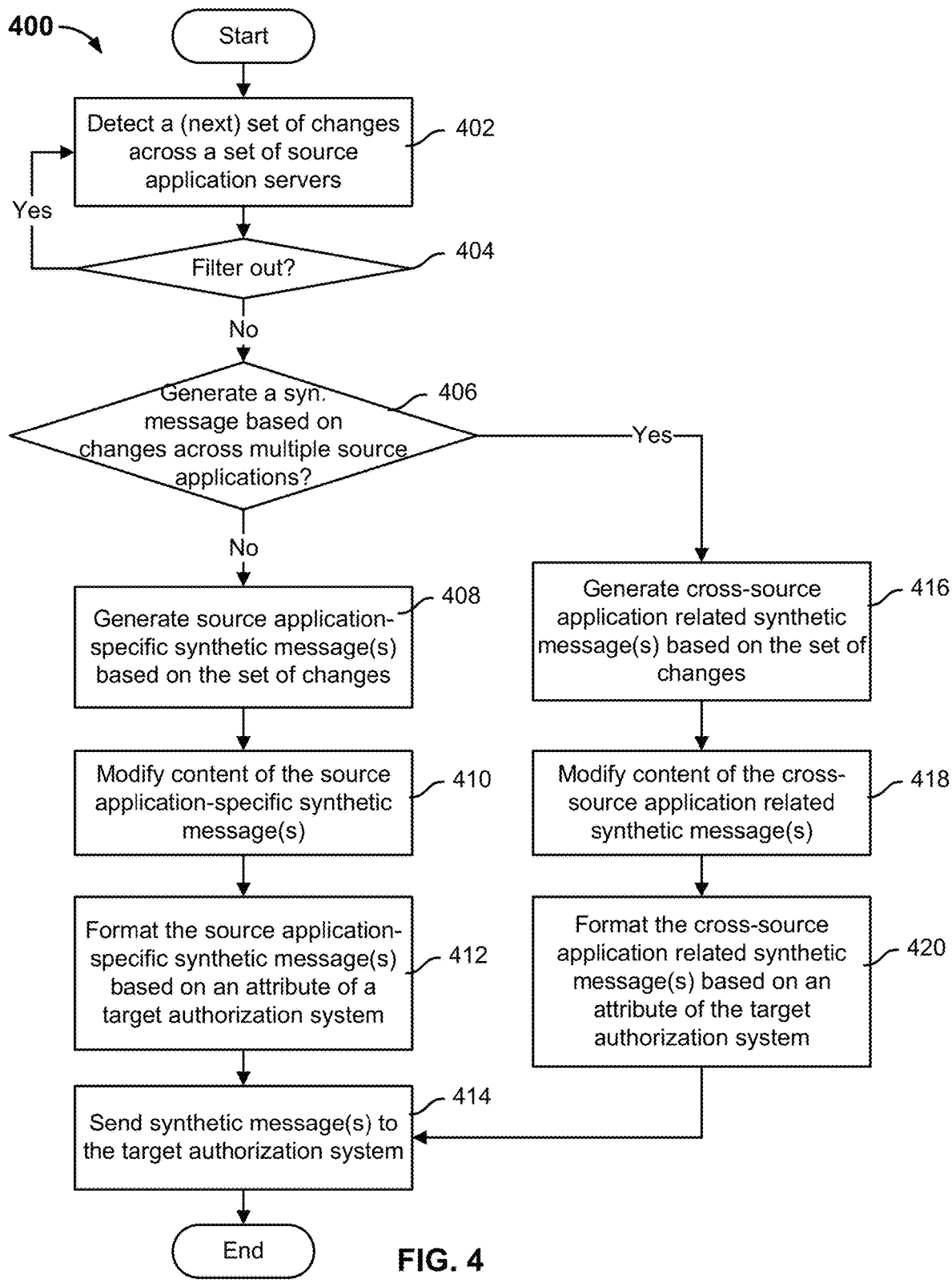
FIG. 4 is a flow diagram showing an example of a process for providing monitoring of updates at a set of source application servers for a target authorization system in accordance with some embodiments.

FIG. 4 is a flow diagram showing an example of a process for providing monitoring of updates at a set of source application servers for a target authorization system in accordance with some embodiments. In some embodiments, process 400 is implemented at bridging system 108 of system 100 of FIG. 1. In some embodiments, process 300 of FIG. 3 may be implemented, at least in part, using process 400.

At 402, a (next) set of changes is detected across a set of source application servers. The bridging system can detect changes/updates from one or more (e.g., SaaS) source application servers using one or more of the following example techniques: observing changes while being integrated with the source applications, receiving messages or events emitted by the source applications, and/or subscribing to pushed telemetric updates from the source applications. In some embodiments, a detected change/update may pertain to a particular entity (e.g., a user, an integration, or an automated process). As mentioned above, examples of a detected change that involves an entity at a SaaS source application may include one or more of the following: an entity gaining access to a permission, performing an access to a file/component, connecting to another system, changing an IP address or location, elevating permissions, utilizing administrative/elevated permissions, performing an operation on data, and being created/updated.

In some embodiments, a detected change/update may not pertain to any particular entity. As mentioned above, examples of a detected change at a SaaS source application that does not involve a particular entity may include the creation/updating of a data record and the creation/updating of an application component.

At 404, whether the set of changes is to be filtered out is determined. In the event that the set of changes is determined to be filtered out, control is returned to 402. Otherwise, in the event that the set of changes is not determined to be filtered out, control is transferred to 406. In some embodiments, not every change that is detected at a source application is to be forwarded onto a target authorization system. Before a detected change is packaged/translated into a synthetic message to be sent to a target authorization system, in some embodiments, it is first determined whether the detected change matches filtering out criteria, which may describe, for example, attributes of detected changes that are not sufficiently relevant to an authorization system's evaluation of whether authorization actions should be performed. For example, a parameter (e.g., a risk score, asset criticality, and/or identity context) is assigned to each detected change and then the assigned parameter (e.g., risk score, asset criticality, and/or identity context) is compared to filtering out criteria to determine whether the detected change should be forwarded to a target authorization system or otherwise filtered out (not forwarded to the target authorization system).

In some embodiments, detected changes may be filtered out from being sent to a target authorization system because that particular target authorization system may not evaluate those particular types of changes.

At 406, whether a synthetic message should be generated based on the set of changes across multiple source applications is determined. In the event that the synthetic message should be generated based on the set of changes across multiple source applications, control is transferred to 416. Otherwise, in the event that the synthetic message should not be generated based on the set of changes across multiple source applications, control is transferred to 408.

In some embodiments, certain changes that were observed at one source application may be sent in synthetic messages that are specific to a single source application, which may or may not be the same application from which the changes were observed. In some embodiments, multiple changes observed from one source application (e.g., over a period of time) may be batched into a single synthetic message. In some embodiments, changes observed across multiple instances (e.g., multiple accounts) at a single source application may be packaged as changes pertaining to fewer than those instances from the single source application. For example, if an enterprise was running multiple accounts at a single SaaS application, then changes can be monitored across the multiple accounts and collected into synthetic messages to a target authorization system as if all the changes were detected at one logical/container account.

In some embodiments, certain changes that were observed across two or more source applications/application types may be sent in synthetic messages that are cross-applications. In a first example, changes pertaining to the same entity (e.g., user) or a similar pattern can be observed across multiple applications and then packaged into the same synthetic message. In a specific example, observed updates that comprise the same user with failed logins (e.g., within a given window of time) across multiple SaaS applications may be included in a cross-application synthetic message. In a second example, information that is observed from one source application may be represented as if it was actually in a second source application. For example, if it is detected that a user is connected to one source application, which is in turn connected to another source application, then whether one or more of such SaaS applications is an approved or not approved vendor can be queried from a security supply chain risk system and that determination can be inserted into a cross-application synthetic message.

In some embodiments, the synthetic message may identify the source application(s) from which the described change(s) originated as the transmitting entity. In some embodiments, the synthetic message may not identify the source application(s) from which the described change(s) originated and instead only identify the bridging system as the transmitting entity.

At 408, source application-specific synthetic message(s) are generated based on the set of changes. The set of changes that are detected at the source application are then packaged into one or more synthetic messages to be sent to a target authorization system. In some embodiments, which target authorization system is selected to send the synthetic message to may be based on the type of detected changes that are subscribed to by each target authorization system, administrative configuration (e.g., by an enterprise that is subscribed to services from the source application(s)), artificial intelligence and/or machine learning inferred patterns or recommendations, and/or service capability discovery. In some embodiments, the bridging system can select the target authorization system to send the synthetic message to by interrogating another system to find the correct target authorization system for a particular synthetic message and/or underlying detected change(s).

Figure 5:
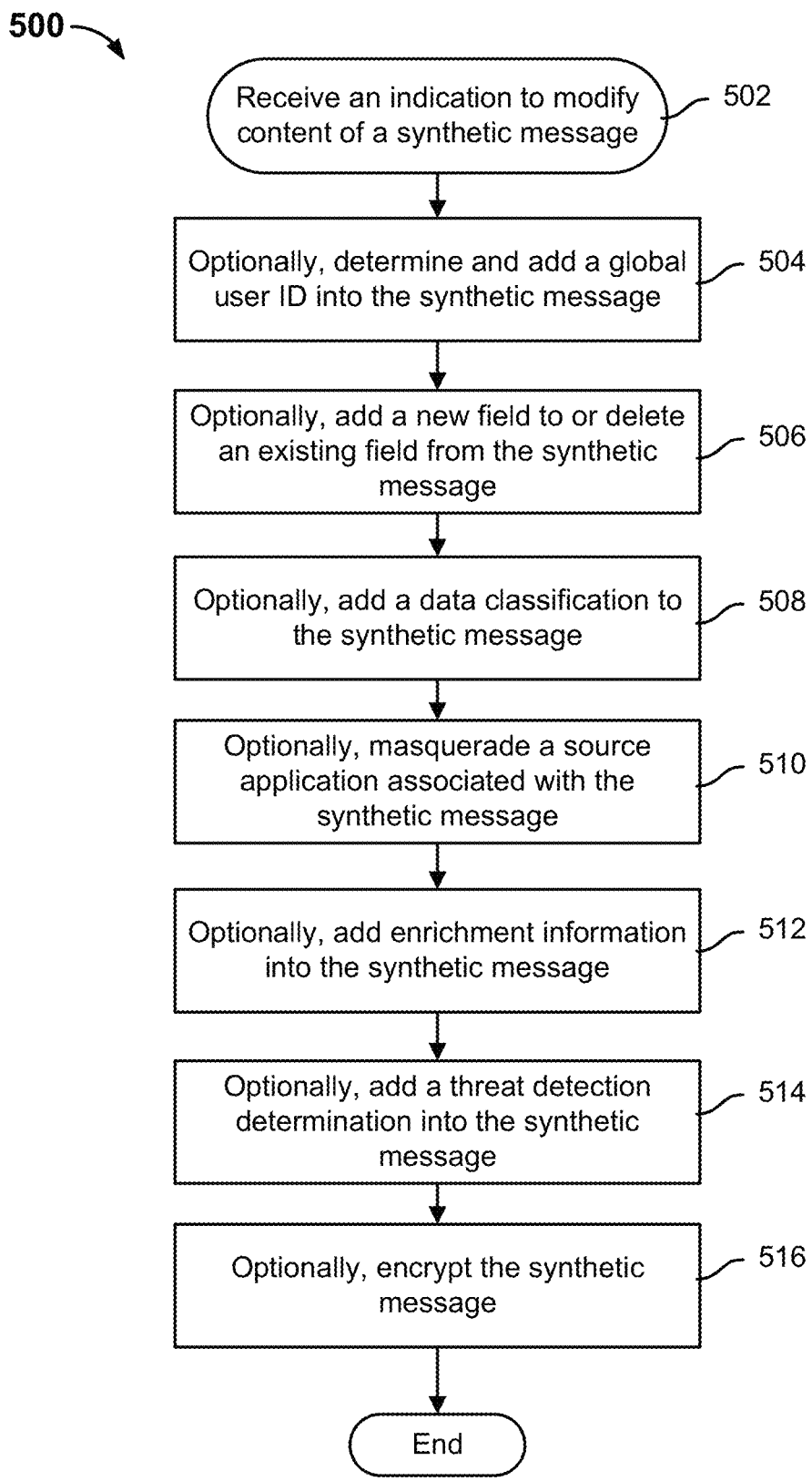
FIG. 5 is a flow diagram showing an example of a process for modifying the content of a synthetic message in accordance with some embodiments.

At 410, content of the source application-specific synthetic message(s) is modified. In some embodiments, the content of the source application-specific synthetic message(s) may be modified (e.g., expanded upon) relative to the original content of the detected changes in one or more ways. FIG. 5, below, describes example techniques of modifying the original content of the detected changes in the synthetic messages that are derived from the changes.

Returning to FIG. 4, at 412, the source application-specific synthetic message(s) are formatted based on an attribute of a target authorization system. In some embodiments, an "attribute" of the target authorization system refers to the (e.g., tracing) protocol (e.g., OpenTelemetry or Shared Signals) that has been adopted by the target authorization system to accept detected changes observed at source application servers. In some embodiments, an "attribute" of the target authorization system refers to the format of information that is required by the target authorization system for the purpose of evaluating whether an authorization action should be performed. For example, a format of information that is required by the target authorization system may be a natural language summary of the detected changes.

At 416, cross-source application related synthetic messages are generated based on the set of changes.

At 418, content of the cross-source application related synthetic messages is modified. FIG. 5, below, describes example techniques of modifying the original content of the detected changes in the synthetic messages that are derived from the changes.

Returning to FIG. 4, at 420, cross-source application related synthetic message(s) are formatted based on an attribute of a target authorization system. In some embodiments, an "attribute" of the target authorization system refers to the (e.g., tracing) protocol (e.g., OpenTelemetry or Shared Signals) that has been adopted by the target authorization system to accept detected changes observed at source application servers. In some embodiments, an "attribute" of the target authorization system refers to the format of information that is required by the target authorization system for the purpose of evaluating whether an authorization action should be performed. For example, a format of information that is required by the target authorization system may be a natural language summary of the detected changes because the machine learning model that is to ingest the information at the authorization system accepts input in the form of natural language.

At 414, the synthetic message(s) are sent to the target authorization system. The generated synthetic message(s), whether they are specific to a single source application or are cross-source applications, are sent to the target authorization system, which is configured to evaluate the synthetic messages to determine whether if and which action should be performed at a source application based on the messages. The target authorization system may not determine that an authorization action is warranted in response to each synthetic message but only those that, when evaluated alone or with other synthetic messages, suggest a security risk that can be mitigated with an action to be performed at a target source application.

FIG. 5 is a flow diagram showing an example of a process for modifying the content of a synthetic message in accordance with some embodiments. In some embodiments, process 500 is implemented at bridging system 108 of system 100 of FIG. 1. In some embodiments, either step 410 or step 418 of process 400 of FIG. 4 may be implemented, at least in part, using process 500.

Process 500 describes different example ways that the content of a synthetic message that is generated based on change(s) that are detected at one or more source applications can be modified. In actual practice, the content of a synthetic message may be modified in zero or more of the example ways described in process 500.

At 502, an indication to modify content of a synthetic message is received. For example, the synthetic message may be related to a single source application or across more than one source application. In some embodiments, the synthetic message is generated using at least a portion of process 400 of FIG. 4.

At 504, optionally, a global user ID is determined and added into the synthetic message. In some embodiments, the bridging system maintains for each user, mappings between the user's source application-specific ID at each source application and also a global user ID associated with the user. As such, in the event that a source application-specific user ID is included in the detected change, the user's global user ID can be looked up and then added into the synthetic message that is generated from that detected change.

At 506, optionally, a new field is added to or an existing field is deleted from the synthetic message. In some embodiments, the detected change that is included in the synthetic message comprises fields that conform to a format associated with one type of source application. However, the target authorization system may be configured to ingest information in a different format. To accommodate the format of information that is ingested by the target authorization system, the bridging system can add additional fields or remove existing fields to the synthetic message to emulate the desired data format of the authorization system.

At 508, optionally, a data classification is added to the synthetic message. In some embodiments, a third-party data classification service may (e.g., periodically) scan the data at a source application and then determine data classifications for the scanned data. The bridging system can query such a data classification service to obtain data classifications (e.g., image data, payment data, video data, etc.) related to the source application to a particular instance of a source application from such a third-party service and then optionally, insert the obtained data classification(s) into synthetic messages that are generated from changes that are detected from the source application. The resulting message content that has been augmented with additional information (e.g., a data classification) can be thought of as originating from a "virtual" application and comprises a higher fidelity message.

At 510, optionally, a source application associated with the synthetic message is masqueraded. In some embodiments, the synthetic message comprises fields that conform to a format associated with one type of source application. However, the target authorization system may be configured to ingest information that conforms to a different format that is associated with another type of source application. To accommodate the format of information that is ingested by the target authorization system, the bridging system can modify the values of fields, add additional fields, remove existing fields, add labeling to fields, and/or otherwise modify the message content to emulate the format of the other type of source application for which the message format is ingested/recognized by the authorization system. Where the detected changes are included in a synthetic message that is masqueraded to appear to have originated from a different source application than the one the detected changes had actually originated from, the bridging system stores mappings between the originating source application and the masquerading source application so that the bridging system can ensure that a response, if any, from the target authorization system is processed at the correct (originating) source application.

At 512, optionally, enrichment information is added into the synthetic message. In some embodiments, the bridging system can query a third-party enrichment service that aggregates data (e.g., collects metrics or statistics) on entities for enrichment information pertaining to an entity that is identified in the synthetic message. For example, the enrichment information pertaining to a user can identify one or more user IDs that are associated with that user as well as the roles, groups, and/or permissions that are associated with the user. Queried enrichment service can also be added to a synthetic message to add higher fidelity and context into the message.

At 514, optionally, a threat detection determination is added into the synthetic message. In some embodiments, the bridging system can query a third-party threat detection service for a threat detection determination that is relevant to an entity that is identified in the synthetic message. For example, the threat detection service could have been ingesting events or logs from a source application or source applications (e.g., over time) and have analyzed a threat detection determination (e.g., that an entity may be compromised or is associated with abnormal activity). Such a threat detection determination, if any, that is related to an entity that is identified in the message can be added into the message.

At 516, optionally, the synthetic message is encrypted. The bridging system can provide additional security to the synthetic message by encrypting the message, hashing the message, digitally signing the message, and/or otherwise authenticating the message.

Figure 6:
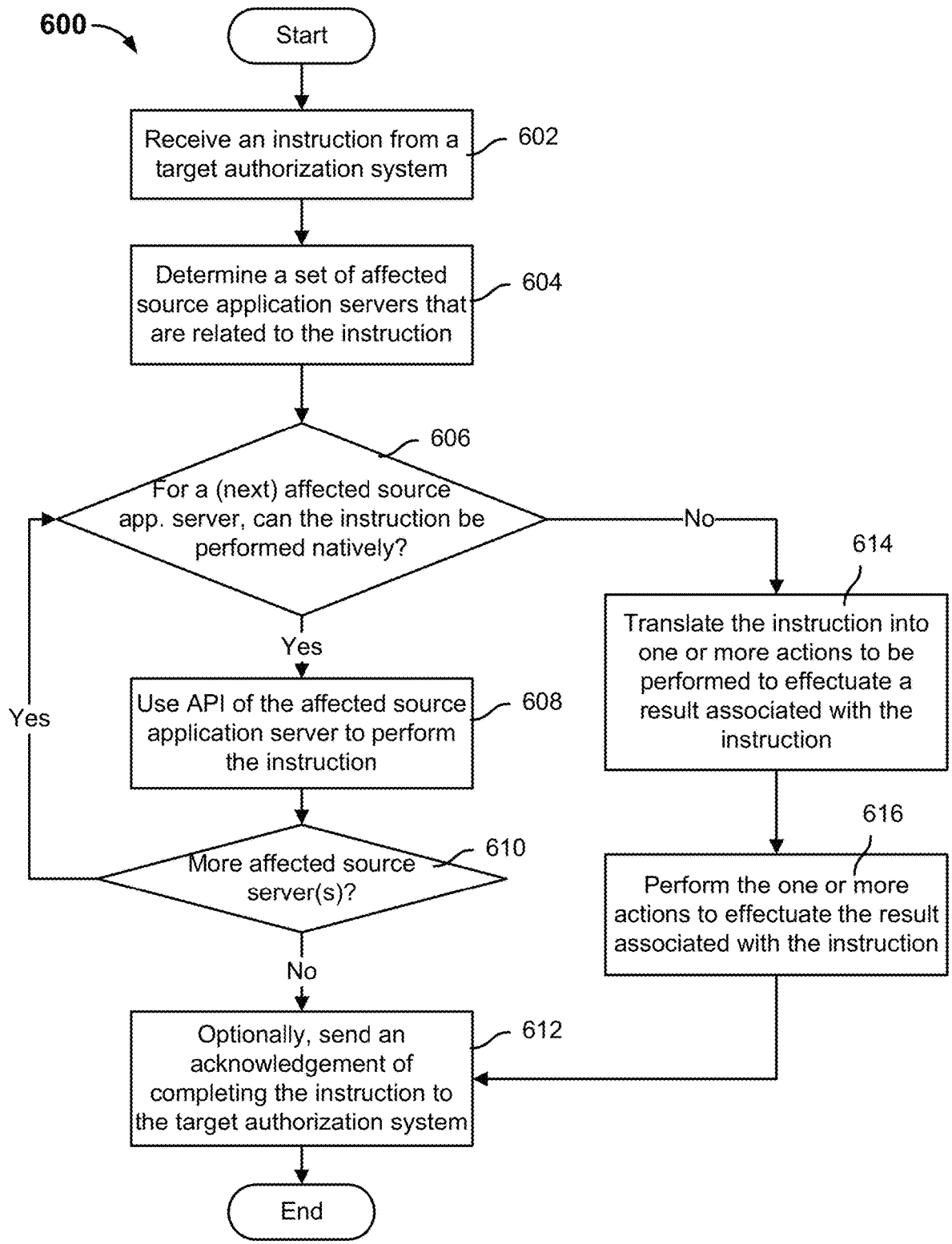
FIG. 6 is a flow diagram showing an example of a process for handling an instruction from a target authorization system in accordance with some embodiments.

FIG. 6 is a flow diagram showing an example of a process for handling an instruction from a target authorization system in accordance with some embodiments. In some embodiments, process 600 is implemented at bridging system 108 of system 100 of FIG. 1.

Process 600 is an example process for handling an instruction that is sent by a target authorization system, for example, in response to a synthetic monitoring message that was sent to the authorization system using a process such as process 300 of FIG. 3 or process 400 of FIG. 4.

At 602, an instruction is received from a target authorization system. The target authorization system may, on the basis of the synthetic message(s) that it had previously received from the bridging system, determine a potential security risk or unusual activity that could be remediated through an authorization action to be performed at one or more (e.g., SaaS) source applications with respect to an entity, for example. For example, an authorization action may result in the reauthentication of a user, the logging out of a user from a source application or from a virtual private network (VPN), the restriction of an entity (e.g., a user, an integration, or an application) from accessing data or a service, the modification of network restrictions to prevent access by an entity, and a communication with another component to block a user's access, disable a user's device, disable a user's network port, and/or terminate a user's network transport access.

In some embodiments, the target authorization system can send the instruction directly to each affected source application server (e.g., such as a uniform resource locator (URL)) associated with the source application, which will be intercepted by the bridging system. In some embodiments, the target authorization system can send the instruction directly to the bridging system.

At 604, a set of affected source application servers that are related to the instruction is determined. The one or more source application servers that are to be affected by the instruction is determined. For example, the instruction may describe authorization actions to be performed at a single source application or more than one source application.

At 606, for a (next) affected source application server, whether the instruction can be performed natively at the affected source application server is determined. In the event that the instruction can be performed natively at the affected source application server, control is transferred to 608. Otherwise, in the event that the instruction can not be performed natively at the affected source application server, control is transferred to 614. Whether the authorization action that is prescribed by the instruction can be natively performed (e.g., a configuration that is natively supported or can be called to be made via an API) at the affected source application server is determined. For example, the bridging system maintains a database that describes which functions are or are not natively supported at each type of source application and if a function is natively supported by a source application, the bridging system can make API call(s) to invoke that function.

At 608, the API of the affected source application server is used to perform the instruction. In some embodiments, where the authorization action that is prescribed by the instruction can be natively performed at the affected source application server, then an API associated with the affected source application server is called to request the instructed authorization action (e.g., the logging out of a user, the re-authentication request of a user, the restriction of a user's access to data or services) to be performed at the source application server. In some other embodiments, where the authorization action that is prescribed by the instruction can be natively performed at the affected source application server, the instruction is directly forwarded to the affected source application server for the affected source application server to handle locally.

At 610, whether there is at least one more affected source application server is determined. In the event that there is at least one more affected source application server, control is returned to step 606. Otherwise, in the event that there are no more affected source application servers, control is transferred to step 612.

At 614, the instruction is translated into one or more actions to be performed to effectuate a result associated with the instruction. In some embodiments, the bridging system may provide for alternate implementations that approximate the effect of an instruction at the affected source application server when the affected source application server does not natively support the actions. For example, in response to an instruction to disable an entity within an application, which the application may not support, the bridging system may instead remove all permissions and entitlements of the entity, block access to application APIs or interfaces, restrict eligible source IP addresses from which the entity may access an application, or other compensating or mitigating actions.

At 616, the one or more actions to effectuate the result associated with the instruction are performed. In some embodiments, the bridging system may not only perform an action at each of the affected source application servers but additionally or alternatively, perform an action or make a request to a third-party service that achieves the desired effect. For example, if the instruction instructed that a user is prompted to sign into again into his/her VPN, then the bridging system can directly send a request to a server implementing the VPN service, which is separate from the affected source application server, to sign the user out and to prompt the user to sign into the VPN again.

At 612, optionally, an acknowledgment of completing the instruction is sent to the target authorization system. After the instruction is executed/completed, an acknowledgment of this completion is optionally sent to the target authorization system from which the instruction originated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a database configured to store source application information associated with a set of source application servers; and
one or more processors configured to:
monitor an update across the set of source application servers, wherein the update comprises a set of changes across two or more application servers;
translate the update into a synthetic message using the source application information and an attribute associated with a target authorization system, wherein to translate the update comprises to:
determine the set of changes comprises a pattern; and
generate a cross-application synthetic message that combines the set of changes across the two or more application servers; and
send the synthetic message to the target authorization system, wherein the target authorization system is configured to instruct an authorization action to be performed at one or more of the set of source application servers.

2. The system of claim 1, wherein the update comprises one or more of the following: a state change, a user activity, or an event.

3. The system of claim 1, wherein the update comprises a change that pertains to one or more of the following: an entity gaining an access, the entity performing an action in a source application, the entity connecting to another system, the entity changing an Internet Protocol (IP) address, the entity changing a location, the entity elevating a permission, the entity using administrative or elevated permissions, and the entity performing an operation on data.

4. The system of claim 1, wherein the update comprises an event or a log that is emitted by a source application server.

5. The system of claim 1, wherein to translate the update into the synthetic message comprises to determine that an assigned parameter does not meet filtering out criteria.

6. The system of claim 1, wherein to translate the update into the synthetic message comprises to:
determine a source application-specific identifier (ID) of a user identified in the update;
determine a global user ID corresponding to the source application-specific ID; and
add the global user ID into the synthetic message that is generated from the update.

7. The system of claim 1, wherein to translate the update into the synthetic message comprises to:

determine a format of data that is to be ingested by the target authorization system; and based on the format of the data that is to be ingested by the target authorization system, add a new field to the synthetic message.

8. The system of claim 1, wherein to translate the update into the synthetic message comprises to:

obtain a data classification associated with a source application server from which the update was monitored; and add the data classification to the synthetic message.

9. The system of claim 1, wherein to translate the update into the synthetic message comprises to:

determine that a change included in the update had originated from a first source application server; and masquerade a content of the synthetic message to emulate that the change included in the update had originated from a second source application server, wherein the second source application server is different from the first source application server.

10. The system of claim 1, wherein to translate the update into the synthetic message comprises to:

obtain enrichment information associated with an entity identified in the update; and add the enrichment information associated with the entity to the synthetic message.

11. The system of claim 1, wherein the one or more processors are further configured to receive, from the target authorization system, an instruction describing the authorization action.

12. The system of claim 11, wherein the one or more processors are further configured to determine whether the authorization action is able to be performed natively at one or more affected source application servers relative to the instruction.

13. The system of claim 12, wherein in the event that the authorization action is able to be performed natively at the one or more affected source application servers, the one or more processors are configured to make one or more application programming interface (API) calls to the one or more affected source application servers to implement the authorization action.

14. The system of claim 12, wherein in the event that the authorization action is not able to be performed natively at the one or more affected source application servers, the one or more processors are configured to perform an action at the one or more affected source application servers that approximates an effect of the authorization action that is instructed by the target authorization system.

15. A method, comprising:

monitoring an update across a set of source application servers, wherein the update comprises a set of changes across two or more application servers;

translating the update into a synthetic message using source application information associated with the set of source application servers and an attribute associated with a target authorization system, and wherein translating the update comprises:

determining the set of changes comprises a pattern; and generating a cross-application synthetic message that combines the set of changes across the two or more application servers; and sending the synthetic message to the target authorization system, wherein the target authorization system is configured to instruct an authorization action to be performed at one or more of the set of source application servers.

16. The method of claim 15, wherein translating the update into the synthetic message comprises:

determining a source application-specific identifier (ID) of a user identified in the update;

determining a global user ID corresponding to the source application-specific ID; and adding the global user ID into the synthetic message that is generated from the update.

17. The method of claim 15, wherein translating the update into the synthetic message comprises:

determine a format of data that is to be ingested by the target authorization system; and based on the format of the data that is to be ingested by the target authorization system, adding a new field to the synthetic message.

18. The method of claim 15, wherein translating the update into the synthetic message comprises:

determining that a change included in the update had originated from a first source application server; and masquerading a content of the synthetic message to emulate that the change included in the update had originated from a second source application server, wherein the second source application server is different from the first source application server.

\* \* \* \* \*